US012719649B2

(12) United States Patent
Xiong et al.

(10) Patent No.: US 12,719,649 B2
(45) Date of Patent: Aug. 25, 2026

(54) FREQUENCY HOPPING AND COLLISION HANDLING FOR UPLINK TRANSMISSION IN ADVANCED DUPLEX SYSTEMS

(71) Applicant: Intel Corporation, Santa Clara, CA (US)

(72) Inventors: Gang Xiong, Portland, OR (US); Debdeep Chatterjee, San Jose, CA (US); Yingyang Li, Beijing (CN); Yi Wang, Beijing (CN); Sergey Panteleev, Kildare (IE); Salvatore Talarico, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/296,117

(22) Filed: Apr. 5, 2023

(65) Prior Publication Data

US 2023/0239122 A1 Jul. 27, 2023

Related U.S. Application Data

(60) Provisional application No. 63/328,090, filed on Apr. 6, 2022.

(51) Int. Cl.
*H04L 5/00* (2006.01)
*H04B 1/713* (2011.01)
*H04L 5/14* (2006.01)

(52) U.S. Cl.
CPC ........... *H04L 5/0092* (2013.01); *H04B 1/713* (2013.01); *H04L 5/14* (2013.01); *H04B 2201/698* (2013.01)

(58) Field of Classification Search
CPC ....... H04L 5/0092; H04L 5/14; H04L 5/0044; H04L 5/001; H04L 5/0053; H04L 5/0012; H04L 5/0094; H04L 5/1461; H04B 1/713; H04B 2201/698; H04B 1/7143
See application file for complete search history.

(56) References Cited

U.S. PATENT DOCUMENTS

2023/0163937 A1* 5/2023 Awadin .................. H04L 5/001 370/329
2023/0284210 A1* 9/2023 Abdelghaffar .......... H04L 5/001 370/329

OTHER PUBLICATIONS

3GPP, "3rd Generation Partnership Project; Technical Specification Group Radio Access Network;NR;Physical layer procedures for data (Release 17)", 3GPP TS 38.214 V17.0.0 (Dec. 2021), 217 pages.

* cited by examiner

*Primary Examiner* — Nizam U Ahmed
(74) *Attorney, Agent, or Firm* — Gray Ice Higdon, PLLC

(57) ABSTRACT

Various embodiments herein provide techniques for frequency hopping for uplink transmission in advanced duplex systems, e.g., using non-overlapping sub-band full duplex (NOSB-FD) symbols. The frequency hopping may include switching between an NOSB-FD symbol and a non-NOSB-FD symbol. Embodiments further provide techniques for handling collision between uplink transmission and a downlink resource in the NOSB-FD symbol and/or non-NOSB-FD symbol. Other embodiments may be described and claimed.

20 Claims, 13 Drawing Sheets

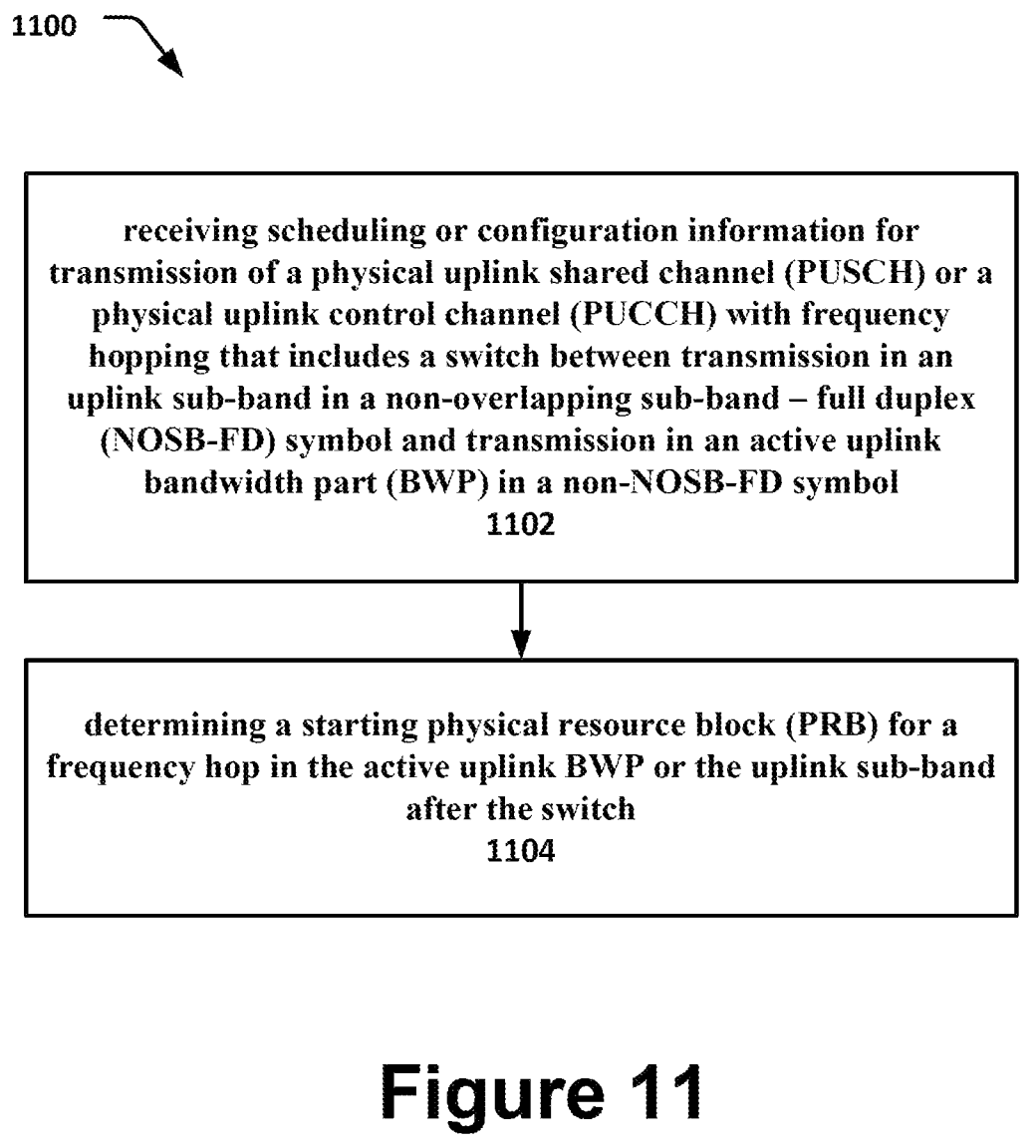

1100 receiving scheduling or configuration information for transmission of a physical uplink shared channel (PUSCH) or a physical uplink control channel (PUCCH) with frequency hopping that includes a switch between transmission in an uplink sub-band in a non-overlapping sub-band – full duplex (NOSB-FD) symbol and transmission in an active uplink bandwidth part (BWP) in a non-NOSB-FD symbol
1102 determining a starting physical resource block (PRB) for a frequency hop in the active uplink BWP or the uplink sub-band after the switch
1104

Figure 11

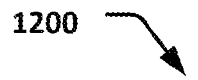

encoding, for transmission to a user equipment (UE), scheduling or configuration information for a physical uplink shared channel (PUSCH) or a physical uplink control channel (PUCCH) with frequency hopping that includes a switch between transmission in an uplink sub-band in a non-overlapping sub-band – full duplex (NOSB-FD) symbol and transmission in an active uplink bandwidth part (BWP) in a non-NOSB-FD symbol
1202 determining a starting physical resource block (PRB) for a frequency hop in the active uplink BWP or the uplink sub-band after the switch
1204 receiving the PUSCH or PUCCH based on the determined starting PRB
1206

Figure 12

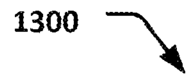

receiving scheduling or configuration information for a physical uplink shared channel (PUSCH) or a physical uplink control channel (PUCCH) with frequency hopping that includes a switch between transmission in an uplink sub-band in a non-overlapping sub-band – full duplex (NOSB-FD) symbol and an active uplink bandwidth part (BWP) in a non-NOSB-FD symbol
1302 identifying that one or more physical resource blocks (PRBs) for a frequency hop of the PUSCH or PUCCH overlap with a downlink sub-band of the NOSB-FD symbol, or are not included in the uplink sub-band of the NOSB-FD symbol, or are not included in the uplink BWP
1304 canceling the frequency hop of the PUSCH or the PUCCH based on the identification
1306

Figure 13

FREQUENCY HOPPING AND COLLISION HANDLING FOR UPLINK TRANSMISSION IN ADVANCED DUPLEX SYSTEMS

CROSS REFERENCE TO RELATED APPLICATION

The present application claims priority to U.S. Provisional Patent Application No. 63/328,090, which was filed Apr. 6, 2022; the disclosure of which is hereby incorporated by reference.

FIELD

Various embodiments generally may relate to the field of wireless communications. For example, some embodiments may relate to frequency hopping and/or collision handling for uplink transmission in advanced duplex systems.

BACKGROUND

Mobile communication has evolved significantly from early voice systems to today's highly sophisticated integrated communication platform. The next generation wireless communication system, fifth generation (5G), which may additionally or alternatively be referred to as new radio (NR), will provide access to information and sharing of data anywhere, anytime by various users and applications. NR is expected to be a unified network/system that target to meet vastly different and sometime conflicting performance dimensions and services. Such diverse multi-dimensional requirements may be driven by different services and applications. In general, NR may evolve based on 3GPP LTE-Advanced with additional potential new Radio Access Technologies (RATs) to enrich people lives with better, simple, and seamless wireless connectivity solutions. NR may enable everything connected by wireless and deliver fast, rich contents and services.

Time Division Duplex (TDD) may be used in commercial NR deployments, where the time domain resource is split between downlink (which may be referred to herein as "DL") and uplink (which may be referred to herein as "UL") symbols. Allocation of a limited time duration for the uplink in TDD can result in reduced coverage and increased latency for a given target data rate. To improve the performance for uplink transmission in TDD system, simultaneous transmission/reception of downlink and uplink respectively, also referred to as "full duplex communication" can be considered. In this regard, the case of Non-Overlapping Sub-Band Full Duplex (NOSB-FD) may be considered.

For NOSB-FD, within a carrier bandwidth, some bandwidth can be allocated as UL, while some bandwidth can be allocated as DL within the same symbol, however the UL and DL resources are non-overlapping in frequency domain. Under this operational mode, at a given symbol a gNB can simultaneously transmit DL signals and receive UL signals, while a UE may only transmit or receive at a time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 11 depicts an example procedure for practicing the various embodiments discussed herein.

FIG. 12 depicts another example procedure for practicing the various embodiments discussed herein.

FIG. 13 depicts yet another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for frequency hopping for uplink transmission in advanced duplex systems. Embodiments further provide techniques for handling collision between uplink transmission and a downlink resource in a duplex system. For example, embodiments may relate to non-overlapping sub-band full duplex (NOSB-FD) operation.

In embodiments, a user equipment (UE) may be scheduled or configured for transmission of an uplink transmission (e.g., physical uplink shared channel (PUSCH) and/or physical uplink control channel (PUCCH)) with frequency hopping. The frequency hopping may include one or more switches between a NOSB-FD symbol and a non-NOSB-FD symbol. Embodiments may include techniques to determine a starting physical resource block (PRB) in an uplink sub-band of the NOSB-FD symbol or an active uplink bandwidth part (BWP) of the non-NOSB-FD symbol. Embodiments further include techniques for collision handling with downlink resources of the NOSB-FD symbol and/or non-NOSB-FD symbol.

Figure 1:
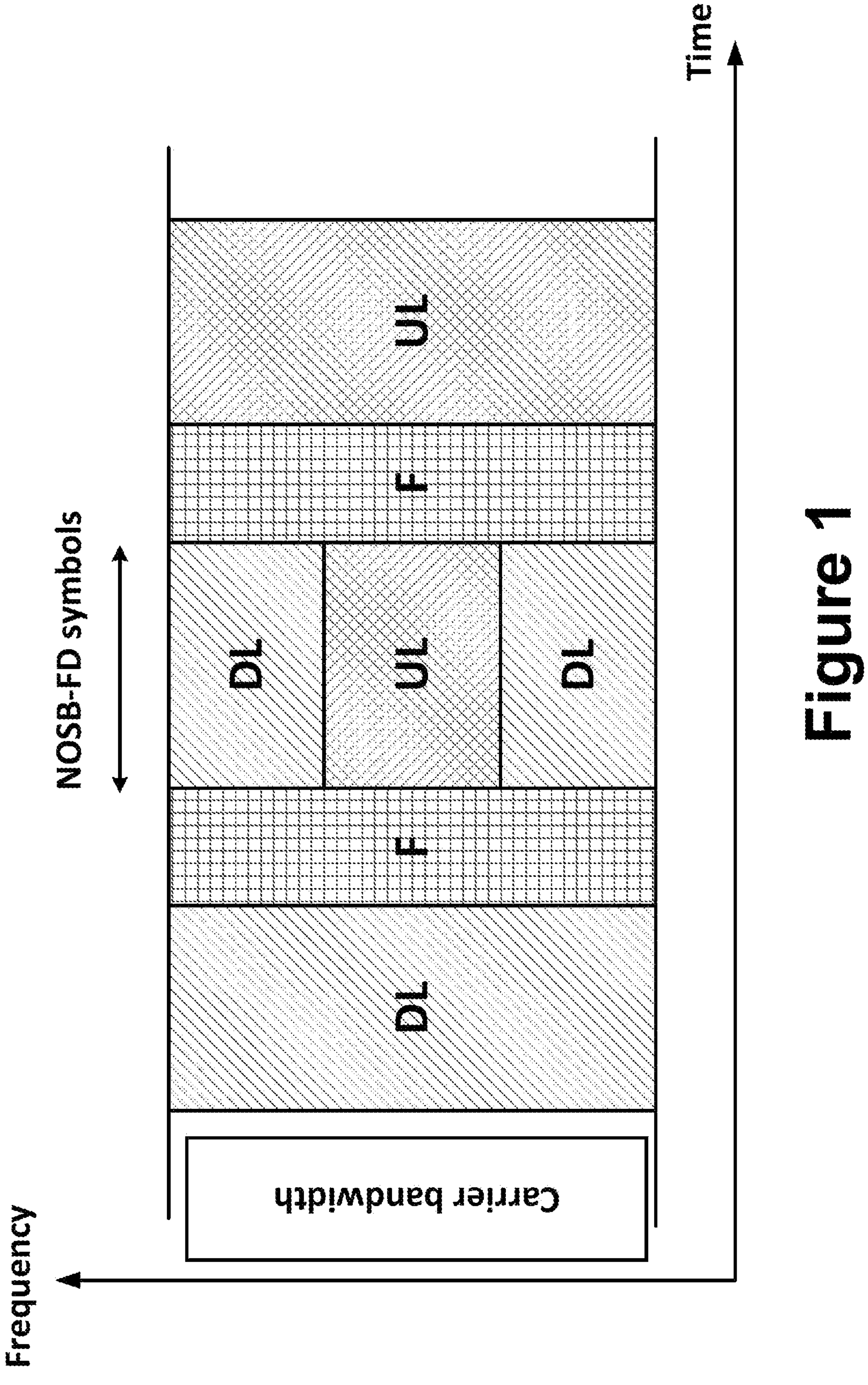
FIG. 1 illustrates an example of Non-Overlapping Sub-Band Full Duplex (NOSB-FD) for NR, in accordance with various embodiments.

FIG. 1 illustrates one example of NOSB-FD for a NR system. As shown, in the NOSB-FD symbols, part of carrier bandwidth is allocated for DL while remaining part of carrier bandwidth is allocated for UL.

In 3GPP NR Release-15/16 (Rel-15/16), intra-slot frequency hopping can be configured or indicated for single-slot physical uplink shared channel (PUSCH) and physical uplink control channel (PUCCH) transmission. For multi-slot PUSCH transmission including PUSCH repetition type A and transport block (TB) processing over multiple slots (TBoMS), and PUCCH repetitions, both intra-slot and inter-slot frequency hopping can be employed, but cannot be enabled simultaneously. In addition, for PUSCH repetition type B, both inter-repetition and inter-slot frequency hopping can be employed, where inter-repetition frequency hopping is performed across nominal repetitions.

In NR Release-17 (Rel-17), inter-slot frequency hopping with demodulation reference signal (DMRS) bundling was specified for multi-slot PUSCH transmission and PUCCH repetitions, where frequency resource for uplink transmission can remain the same for a number of slots/repetitions. This mechanism can allow joint channel estimation at receiver, which can help in improving the channel estimation performance and overall decoding performance for PUSCH and PUCCH transmissions.

For full duplex communication, multi-slot PUSCH transmissions or PUCCH repetitions may be transmitted on the NOSB-FD symbols. When UE switches the PUSCH or PUCCH transmission from legacy symbols (e.g., non-NOSB-FD symbols) to NOSB-FD symbols, certain mechanisms may need to be defined to determine the frequency resource in case of frequency hopping, especially when considering that frequency resource for active UL bandwidth part (BWP) in non-NOSB-FD symbol and UL subband in NOSB-FD symbol may be different.

Embodiments herein relate to enhancements on frequency hopping for uplink transmission in advanced duplex systems. In particular, embodiments may relate to one or more of the following:

Frequency hopping for uplink transmission in full duplex

Handling collision with DL subband in NOSB-FD symbols

Frequency Hopping for Uplink Transmission in Full Duplex

As mentioned above, in NR Rel-15/16, intra-slot frequency hopping can be configured or indicated for single-slot physical uplink shared channel (PUSCH) and physical uplink control channel (PUCCH) transmission. For multi-slot PUSCH transmission including PUSCH repetition type A and TB processing over multiple slots (TBoMS), and PUCCH repetitions, both intra-slot and inter-slot frequency hopping can be employed, but cannot be enabled simultaneously. In addition, for PUSCH repetition type B, both inter-repetition and inter-slot frequency hopping can be employed, where inter-repetition frequency hopping is performed across nominal repetitions.

In NR Rel-17, inter-slot frequency hopping with demodulation reference signal (DMRS) bundling was specified for multi-slot PUSCH transmission and PUCCH repetitions, where frequency resource for uplink transmission can remain the same for a number of slots/repetitions. This mechanism can allow joint channel estimation at receiver, which can help in improving the channel estimation performance and overall decoding performance for PUSCH and PUCCH transmissions.

For full duplex communication, multi-slot PUSCH transmissions or PUCCH repetitions may be transmitted on the NOSB-FD symbols. When UE may switch the PUSCH or PUCCH transmission from legacy symbols to NOSB-FD symbols, certain mechanisms may need to be defined to determine the frequency resource in case of frequency hopping, especially when considering that frequency resource for active UL bandwidth part (BWP) and UL subband in NOSB-FD symbol may be different. For discussion herein, it is assumed that a UE determines a number of PRBs constituting an UL subband in NOSB-FD symbol such that UL signals/channels may be transmitted in these PRBs, wherein the determination may be based on explicit configuration or indication received from the gNodeB or implicitly, e.g., based on specified rules.

Further, in an embodiment, when UL subband or separate UL BWP in NOSB-FD may not be provided to a UE, the UE may assume that UL transmissions may be mapped to any PRB of the active DL BWP in a NOSB-FD symbol. In another embodiment, when UL subband or separate UL BWP in NOSB-FD may not be provided to a UE, the UE may assume that UL transmissions may be mapped to any PRB of the active UL BWP in a NOSB-FD symbol.

Embodiments may be used for PUSCH or PUCCH transmissions that are dynamically scheduled (e.g., by downlink control information) and/or configured by higher layers (e.g., radio resource control (RRC) signaling and/or medium access control (MAC) control element (CE) signaling).

Embodiments of enhancement on frequency hopping for uplink transmission in full duplex systems can be provided as follows:

In one embodiment (Option 1), in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the active UL BWP, regardless of whether UE may switch from UL subband in NOSB-FD symbol to active UL BWP, or vice versa. In particular, the starting RB in each hop for the PUSCH transmission is given by:

$$RB_{start} = \begin{cases} RB_{start} & i = 0 \\ (RB_{start} + RB_{offset}) \bmod N_{BWP}^{size} & i = 1 \end{cases}$$

Where i=0 and i=1 are the first hop and the second hop respectively, and $RB_{start}$ is the starting RB within the UL BWP, as calculated from the resource block assignment information of resource allocation type 1 or as calculated from the resource assignment for MsgA PUSCH and $RB_{offset}$ is the frequency offset in RBs between the two frequency hops [1].

For PUCCH transmission, an index of the first PRB prior to frequency hopping, and after frequency hopping are determined in accordance with the active UL BWP.

Note that in the above and elsewhere in this disclosure, the condition "when UE may switch from UL subband in NOSB-FD symbol to active UL BWP, or vice versa" may be interpreted to imply a scenario wherein a UE may be configured with NOSB-FD operation or may be provided with information on presence of NOSB-FD symbols based on higher layer configuration or dynamic indication or a combination thereof.

Further, the size of the active UL BWP is used to determine the frequency offset for the PUSCH transmission. In particular, When the size of the active BWP is less than 50 PRBs, one of two higher layer configured offsets is indicated in the UL grant.

When the size of the active BWP is equal to or greater than 50 PRBs, one of four higher layer configured offsets is indicated in the UL grant In another variant of the embodiment (Option 1 variant), in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the active UL BWP if the PUSCH or PUCCH, including any repetitions, does not overlap with a NOSB-FD symbol.

Figure 2:
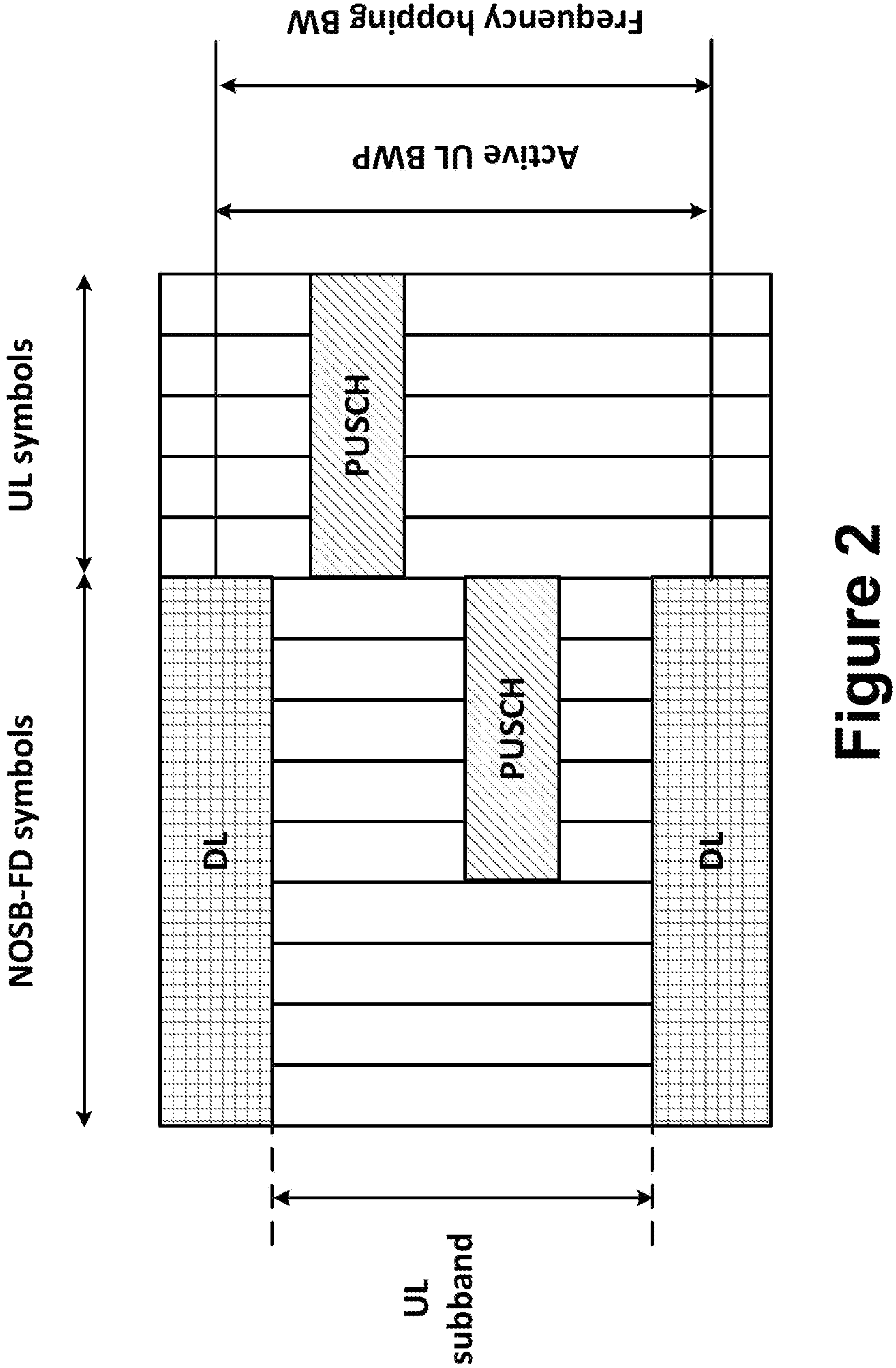
FIG. 2 illustrates an example of intra-slot frequency hopping for single-slot physical uplink shared channel (PUSCH) transmission with NOSB-FD, in accordance with various embodiments.

FIG. 2 illustrates one example of intra-slot frequency hopping for single-slot PUSCH transmission in case of NOSB-FD. In the example, UE switches from UL SB in NOSB-FD symbols to active UL BWP for PUSCH transmission in case of intra-slot frequency hopping. Based on the option, the frequency resource for the second hop is determined based on the location and BW of the active UL BWP.

In another embodiment (Option 2), in case of frequency hopping, when UE may switch from UL subband in NOSB-FD symbol to active UL BWP, or vice versa, for the PUSCH or PUCCH transmission, the starting PRB for a frequency hop is determined in accordance with the UL SB in NOSB-FD symbols, regardless of whether UE may switch from UL subband in NOSB-FD symbol to active UL BWP, or vice versa. In particular, the starting RB in each hop for the PUSCH transmission is given by:

$$RB_{start} = \begin{cases} RB_{start} & i = 0 \\ (RB_{start} + RB_{offset}) \bmod N_{SB}^{size} & i = 1 \end{cases}$$

Where i=0 and i=1 are the first hop and the second hop respectively, and $RB_{start}$ is the starting RB within the UL SB in NOSB-FD symbols or the active UL BWP, as calculated from the resource block assignment information of resource allocation type 1 or as calculated from the resource assignment for MsgA PUSCH and $RB_{offset}$ is the frequency offset in RBs between the two frequency hops, $$N_{SB}^{size}$$

is the size of UL subband in NOSB-FD symbols (e.g., as defined in 3GPP Technical Standard (TS) 38.214, V17.0.0 [1]).

For PUCCH transmission, an index of the first PRB prior to frequency hopping, and after frequency hopping are determined in accordance with the UL SB in NOSB-FD symbols Further, the size of the UL subband in NOSB-FD symbols is used to determine the frequency offset for the PUSCH transmission. For example:

When the size of the UL subband in NOSB-FD symbols is less than 50 PRBs, one of two higher layer configured offsets is indicated in the UL grant.

When the size of UL subband in NOSB-FD symbols is equal to or greater than 50 PRBs, one of four higher layer configured offsets is indicated in the UL grant In another variant of the embodiment (Option 2 variant), in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the UL subband in NOSB-FD symbols if the PUSCH or PUCCH, including any repetitions, does not overlap with a regular (UL or Flexible) symbol.

Figure 3:
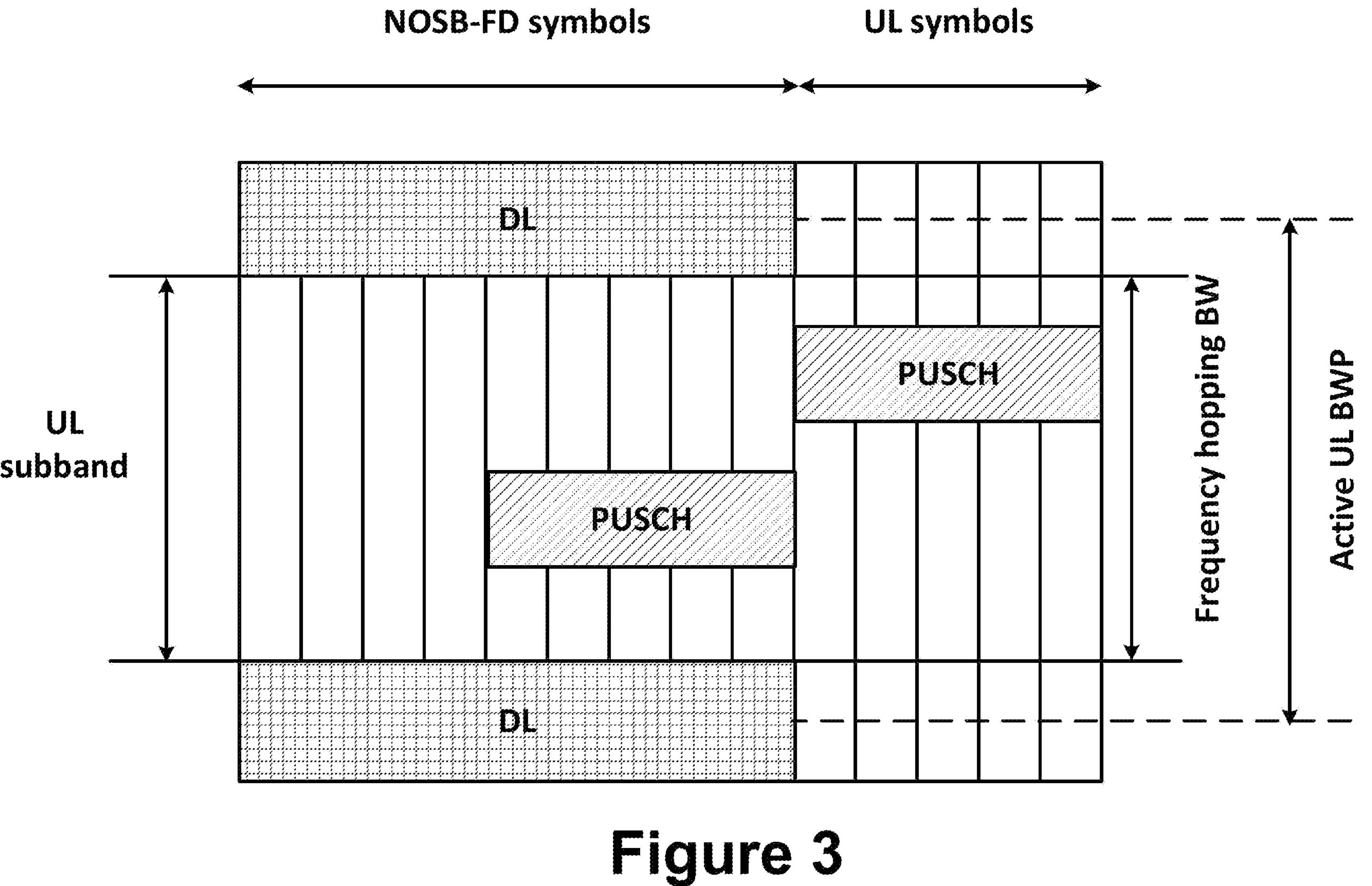
FIG. 3 illustrates another example of intra-slot frequency hopping for single-slot PUSCH transmission with NOSB-FD, in accordance with various embodiments.

FIG. 3 illustrates one example of intra-slot frequency hopping for single-slot PUSCH transmission in case of NOSB-FD. In the example, UE switches from UL SB in NOSB-FD symbols to active UL BWP for PUSCH transmission in case of intra-slot frequency hopping. Based on the option, the frequency resource for the second hop is determined based on the location and BW of the UL subband in NOSB-FD symbols.

Yet, in another option (Option 3), in case when an UL BWP is configured within NOSB-FD symbols, in case of frequency hopping, when UE may switch from UL subband in NOSB-FD symbol to active UL BWP, or vice versa, for the PUSCH or PUCCH transmission, the starting PRB for a frequency hop is determined in accordance with an UL BWP, which is configured in a NOSB-FD symbol. Note that the UL BWP may be included in the UL subband in NOSB-FD symbols and can be configured by RRC signalling. Alternatively, the UL BWP may be determined by the location and bandwidth configuration for the UL BWP configured in a NOSB-FD symbol.

Note that for this option, the UL BWP which is configured within NOSB-FD symbols can be considered as secondary UL BWP while the active UL BWP is considered as primary UL BWP. Further, in an example, the UL BWP configuration for a NOSB-FD symbol may only be limited to the values of locationAndBandwidth parameter to indicate the frequency location and BW of the BWP while other parameters are reused from UL BWP configured for regular symbols.

Figure 4:
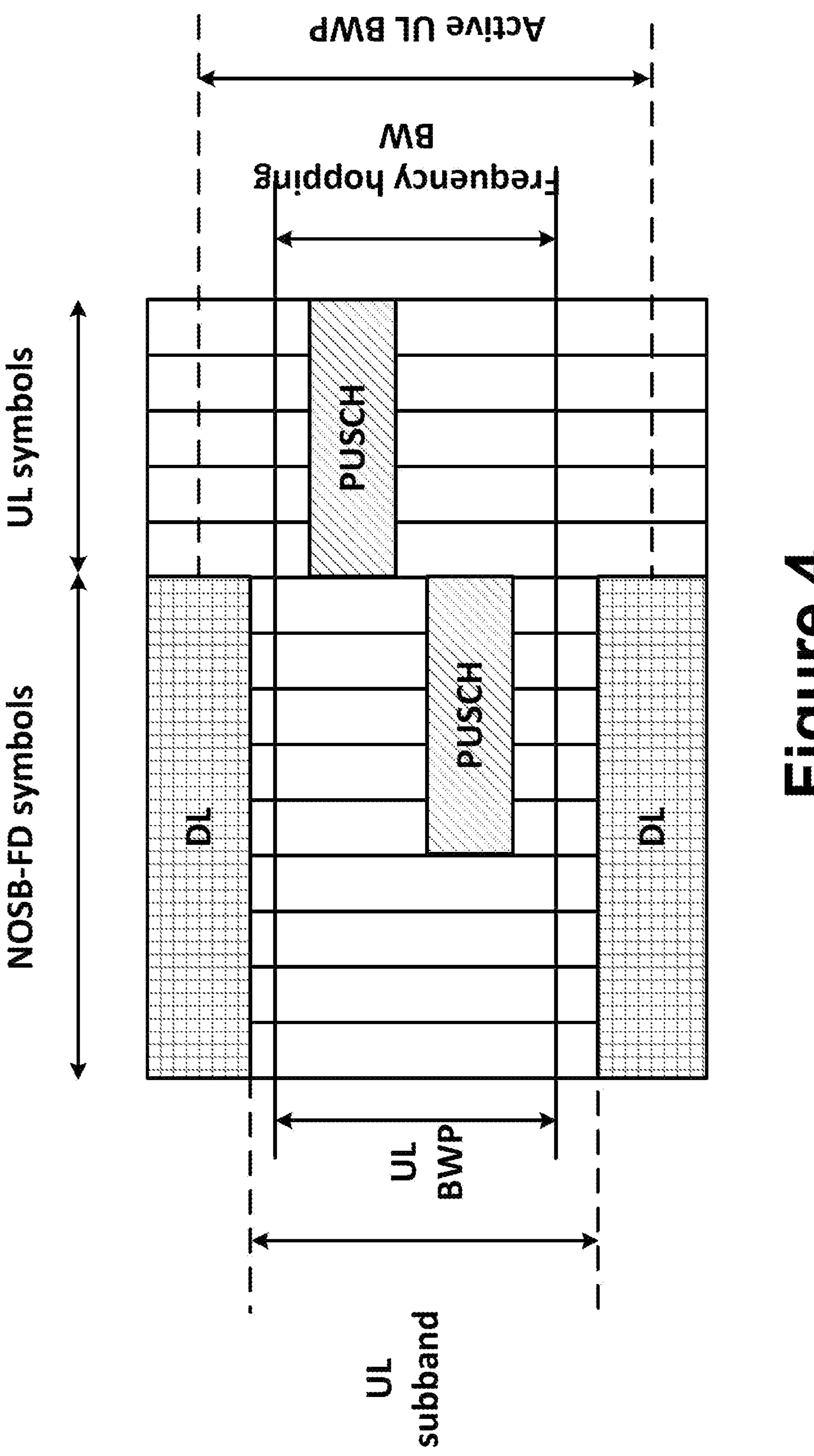
FIG. 4 illustrates another example of intra-slot frequency hopping for single-slot PUSCH transmission with NOSB-FD, in accordance with various embodiments.

FIG. 4 illustrates one example of intra-slot frequency hopping for single-slot PUSCH transmission in case of NOSB-FD. In the example, UE switches from UL SB in NOSB-FD symbols to active UL BWP for PUSCH transmission in case of intra-slot frequency hopping. Based on the option, the frequency resource for the second hop is determined based on the location and BW of the secondary UL BWP configured in NOSB-FD symbols. Further, the size of secondary UL BWP is less than the size of the UL subband in NOSB-FD symbols, followed by the size of primary UL BWP.

In another embodiment (Option 4), in case of frequency hopping, when UE may switch from UL subband in NOSB-FD symbol to active UL BWP, or vice versa, for the PUSCH and/or PUCCH transmission, the starting PRB for a frequency hop is determined in accordance with one of: (i) UL SB in NOSB-FD symbols or UL BWP configured in NOSB-FD symbols and (ii) active UL BWP, whichever is associated with the smaller BW.

In the example as shown in the FIG. 4, the frequency resource for the second hop is determined based on the size of the UL BWP configured in NOSB-FD symbols.

In yet another variation of this embodiment, in case of frequency hopping, when UE may switch from UL subband in NOSB-FD symbol to active UL BWP, or vice versa, for the PUSCH and/or PUCCH transmission, the starting PRB for a frequency hop is determined in accordance with intersection of frequency resource for UL SB in NOSB-FD symbols or UL BWP configured in NOSB-FD symbols and active UL BWP. Note that this may apply for the case when frequency resource for UL subband in NOSB-FD symbols or UL BWP configured in NOSB-FD symbols and active UL BWP partially overlap.

Figure 5:
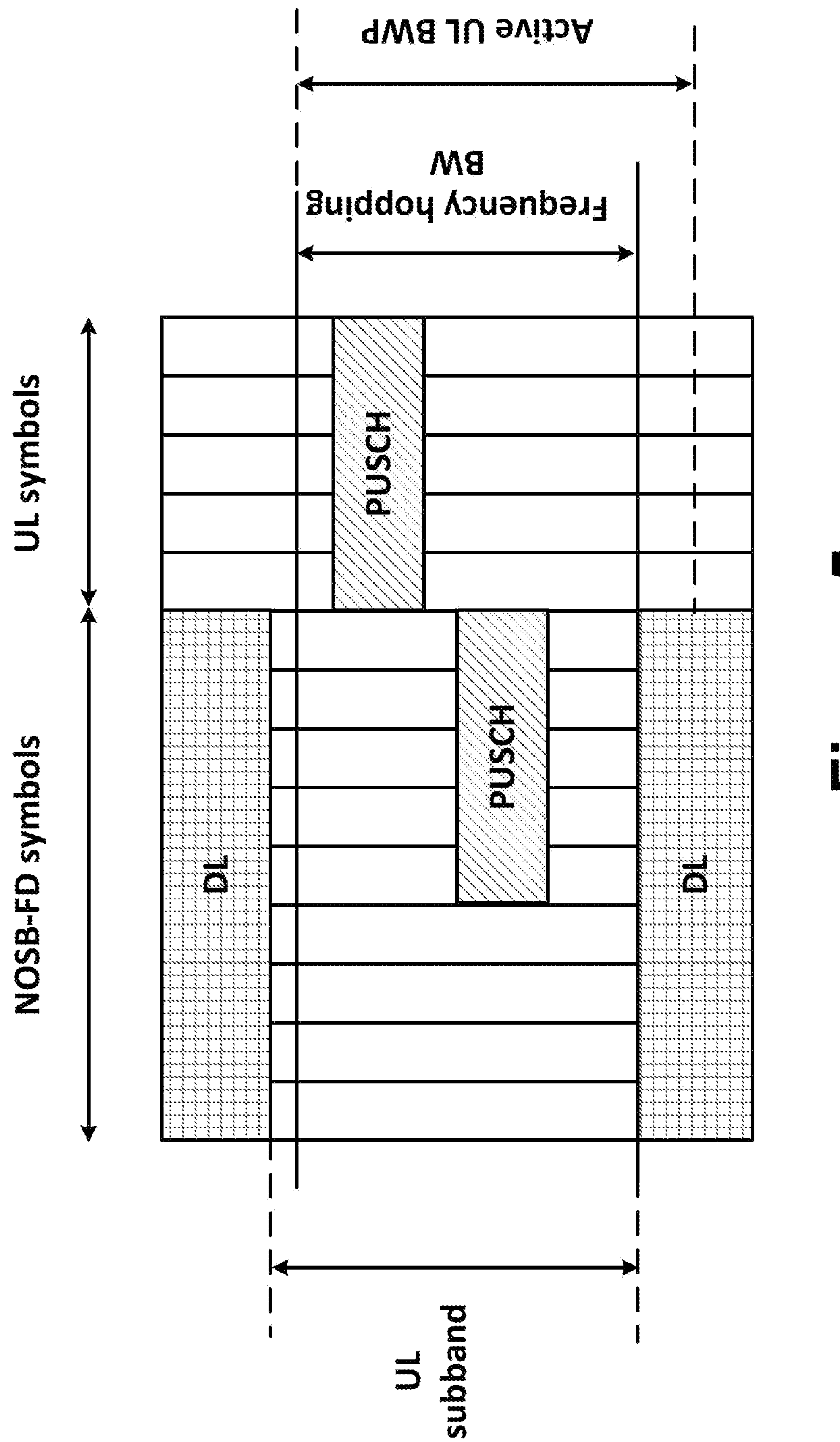
FIG. 5 illustrates another example of intra-slot frequency hopping for single-slot PUSCH transmission with NOSB-FD, in accordance with various embodiments.

FIG. 5 illustrates one example of intra-slot frequency hopping for single-slot PUSCH transmission in case of NOSB-FD. In the example, UE switches from UL SB in NOSB-FD symbols to active UL BWP for PUSCH transmission in case of intra-slot frequency hopping. Based on the option, the frequency resource for the second hop is determined based on the resource region defined by the intersection between UL subband and active UL BWP.

In another embodiment (Option 5), in case of frequency hopping, when UE may switch from UL subband in NOSB-FD symbol to active UL BWP, or vice versa, for the PUSCH and/or PUCCH transmission, the starting PRB for a frequency hop is determined in accordance with a frequency region where the first configured, scheduled, or valid PUSCH or PUCCH transmission or the first hop of the PUSCH/PUCCH transmission is located. Note that the frequency region can be UL subband in NOSB-FD symbols or UL BWP configured in NOSB-FD symbols or the active UL BWP.

Note that valid PUSCH indicates that PUSCH is actually transmitted, or not overlapping with a DL symbol indicated by tdd-UL-DL-ConfigurationCommon or tdd-UL-DL-ConfigurationDedicated if provided, or a symbol of an SS/PBCH block with index provided by ssb-PositionsInBurst.

In particular, if the first PUSCH transmission or hop is allocated in the UL subband in NOSB-FD symbols or UL BWP configured in NOSB-FD symbols, the frequency resource for the second hop is also determined in accordance with the UL subband in NOSB-FD symbols or UL BWP configured in NOSB-FD symbols.

Further, if the first PUSCH transmission or hop is allocated in the active UL BWP, the frequency resource for the second hop is also determined in accordance with the active UL BWP.

In another embodiment (Option 6), in case of frequency hopping, when UE may switch from UL subband in NOSB-FD symbol to active UL BWP, or vice versa, for the PUSCH and/or PUCCH transmission, the starting PRB for a frequency hop is determined in accordance with a frequency region where the first symbol of the PUSCH and/or PUCCH transmission in each hop is located. Note that the frequency region can be UL subband in NOSB-FD symbols or UL BWP configured in NOSB-FD symbols or the active UL BWP.

In one example, in the FIG. 4, the frequency resource of the first hop is determined based on the UL subband of NOSB-FD symbols, where the frequency resource of the second hop is determined based on the active UL BWP.

Handling Collision with DL Subband in NOSB-FD Symbols

Embodiments of handling collision with DL subband in NOSB-FD symbols are described further below.

In another embodiment, in case of frequency hopping, when UE may switch from UL subband in NOSB-FD symbol to active UL BWP, or vice versa, for the PUSCH and/or PUCCH transmission, if the determined PRBs for a hop overlap with a DL subband or are not included in the UL BWP or UL subband in NOSB-FD symbols, the PUSCH or PUCCH transmission in the hop may be cancelled.

Figure 6:
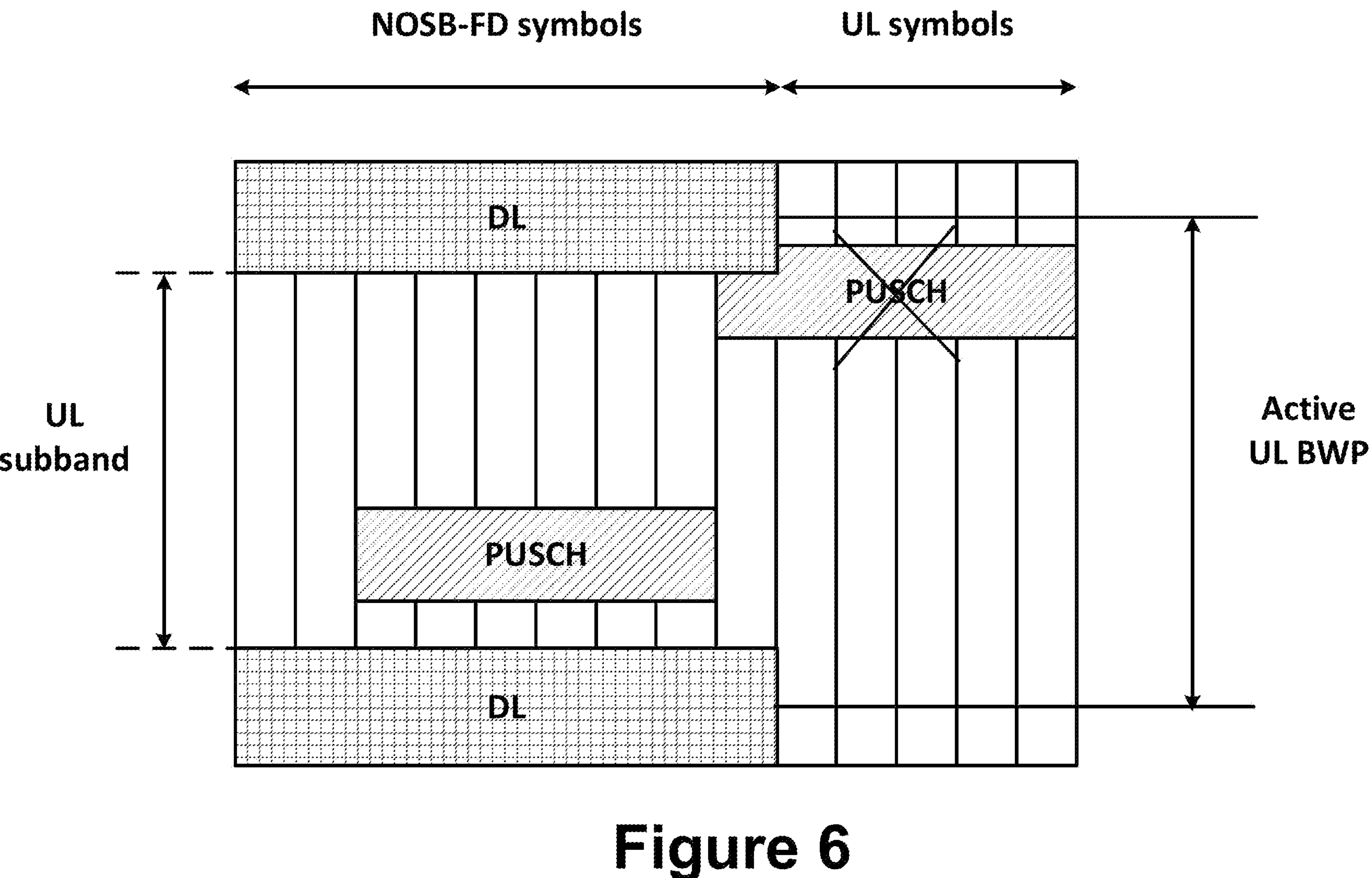
FIG. 6 illustrates an example of cancellation of PUSCH transmission when overlapping with DL subband in case of frequency hopping, in accordance with various embodiments.

FIG. 6 illustrates one example of cancellation of PUSCH transmission when overlapping with DL subband in case of frequency hopping. In the example, UE may switch from UL SB in NOSB-FD symbols to active UL BWP for PUSCH transmission in case of intra-slot frequency hopping. In addition, the determined frequency resource for the second hop overlaps with DL subband in NOSB-FD symbols. In this case, the PUSCH in the second hop is cancelled.

In another option, if the determined PRBs for a hop overlap with a DL subband or are not included in the UL BWP or UL subband in NOSB-FD symbols, the PUSCH or PUCCH repetition or slot or transmission occasion associated with the corresponding hop may be cancelled.

In another option, if the determined PRBs for a hop overlap with a DL subband or are not included in the UL BWP or UL subband in NOSB-FD symbols, the whole PUSCH or PUCCH transmission may be cancelled.

In another option, a UE does not expect that a determined PRBs for a hop of an UL transmission overlap with a DL sub-band. In one alternative, this may be applicable to both dynamically scheduled/triggered UL channels AND configured UL channels, or in another alternative, only applicable to dynamically scheduled/triggered UL channels and not applicable to configured UL channels.

In another embodiment, for PUSCH repetition type B, in case of frequency hopping, when UE may switch from UL subband in NOSB-FD symbol to active UL BWP, or vice versa, if the determined PRBs for a hop overlap with a DL subband or are not included in the UL BWP or UL subband in NOSB-FD symbols, the symbols that include the overlapped PRBs are considered as invalid symbols.

In another embodiment, for PUSCH repetition type A with counting based on available slot, TBoMS and PUCCH repetitions, when UE may switch from UL subband in NOSB-FD symbol to active UL BWP, or vice versa, for the PUSCH and/or PUCCH transmission, a slot is not counted as available slot if the determined PRBs for a hop in the slot overlap with a DL subband or are not included in the UL BWP or UL subband in NOSB-FD symbols.

Figure 7:
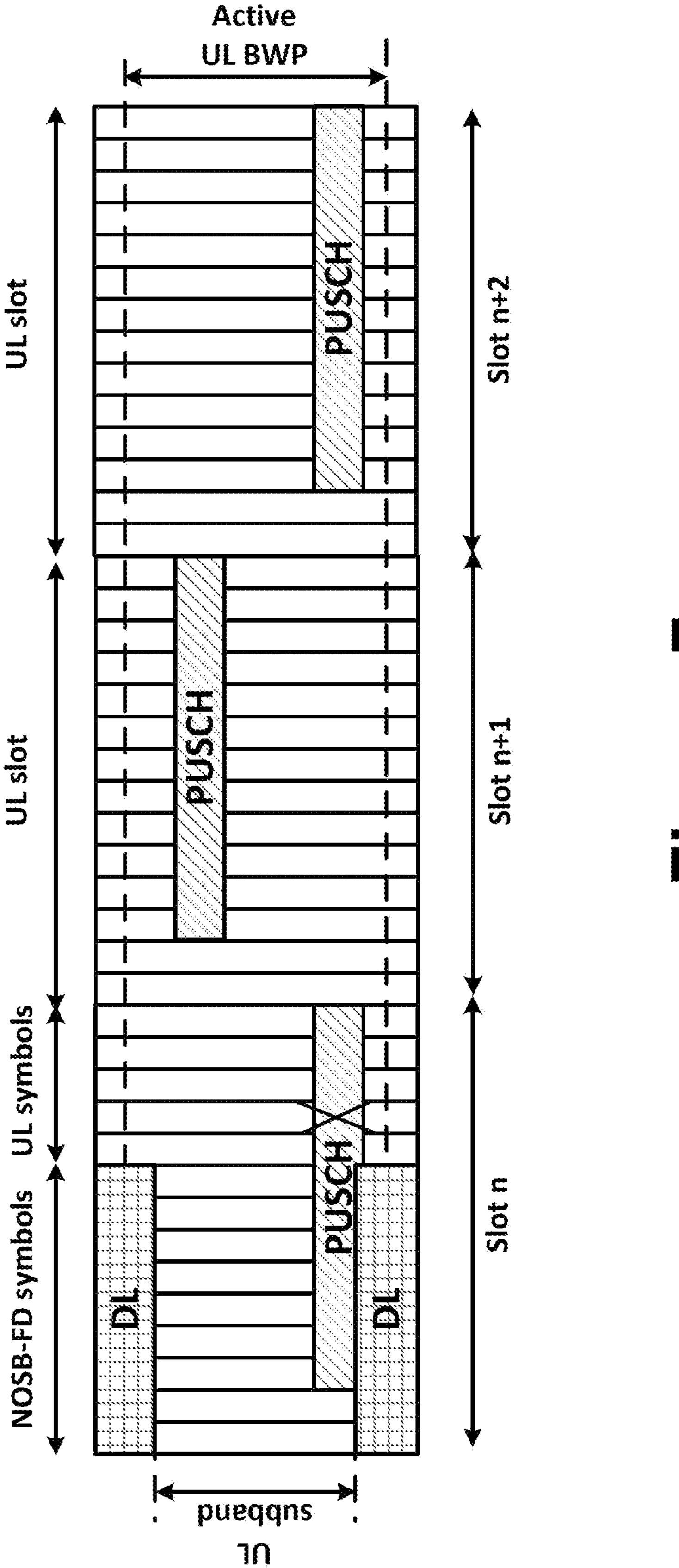
FIG. 7 illustrates an example of available slot determination when overlapping with DL subband in case of frequency hopping, in accordance with various embodiments.

FIG. 7 illustrates one example of available slot determination when overlapping with DL subband in case of frequency hopping. In the example, inter-slot frequency hopping is employed. In addition, 2 repetitions are indicated for PUSCH repetition type A with counting based on available slots. As the determined PRBs in the slot n overlap with a DL subband in NOSB-FD symbols, the slot n is not counted as available slot for PUSCH repetition. In this case, slots n+1 and n+2 are counted as available slots.

Note that this may also apply for the case when PUCCH is configured based on sub-slot-based configuration. Further, the above embodiments may commonly apply for all PUCCH formats. In another option, different embodiments may apply for different PUCCH formats.

Further, the above embodiments may apply for the intra-slot, inter-slot and inter-repetition frequency hopping for single-slot and multi-slot PUSCHs and PUCCH repetitions, respectively. These embodiments may also apply for the inter-slot frequency hopping with DMRS bundling.

Systems and Implementations

Figure 8:
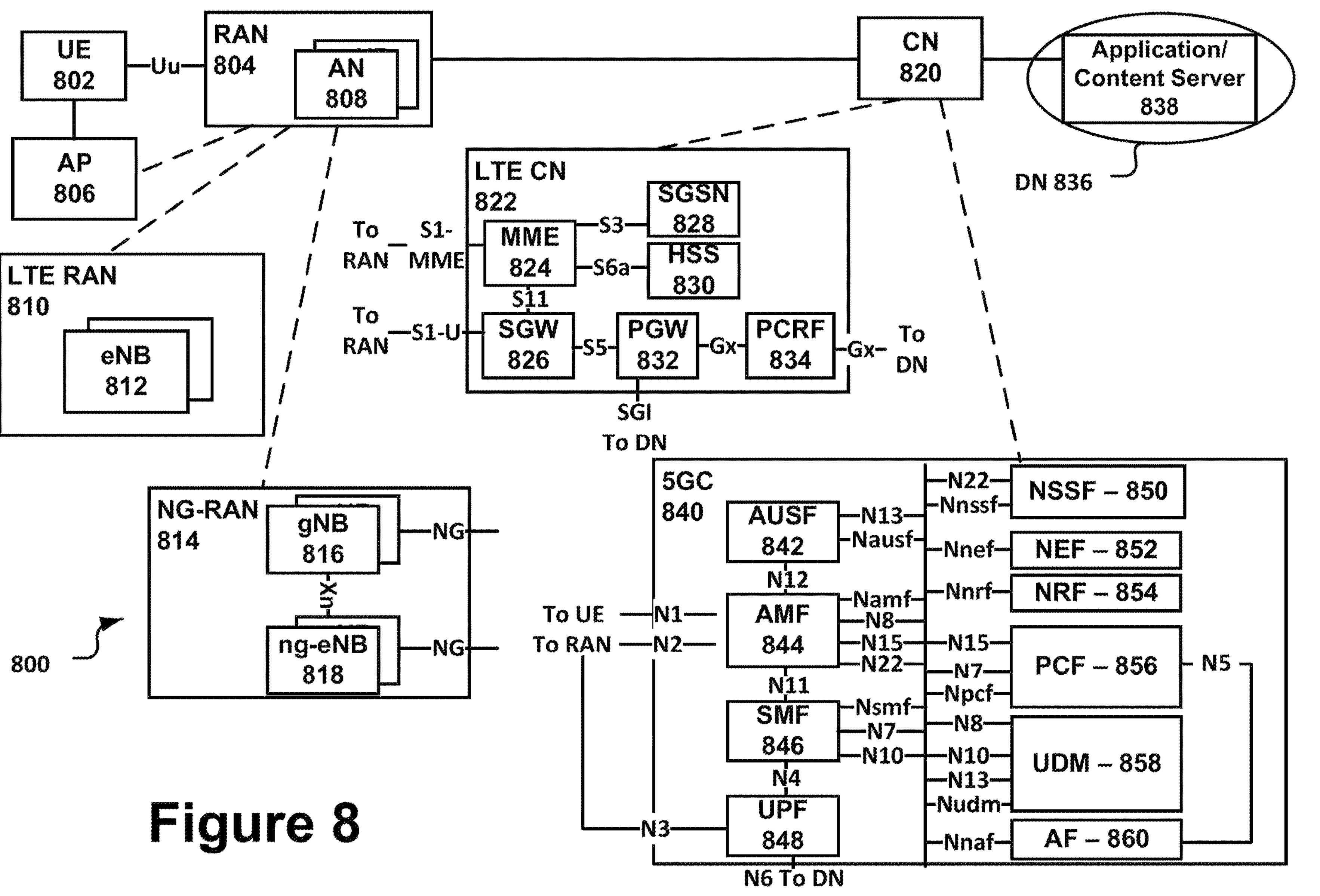
FIG. 8 schematically illustrates a wireless network in accordance with various embodiments.
Figure 9:
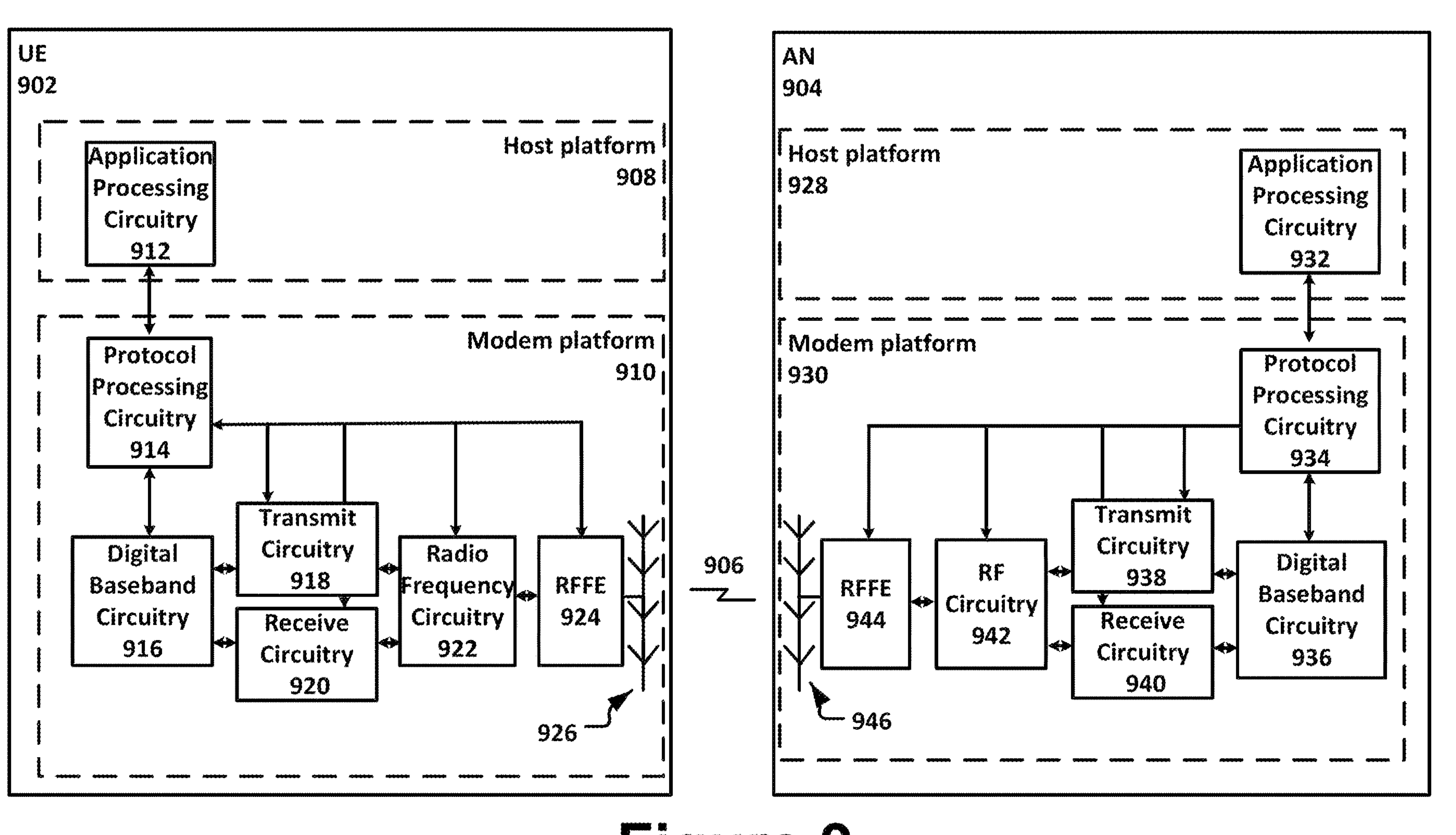
FIG. 9 schematically illustrates components of a wireless network in accordance with various embodiments.
Figure 10:
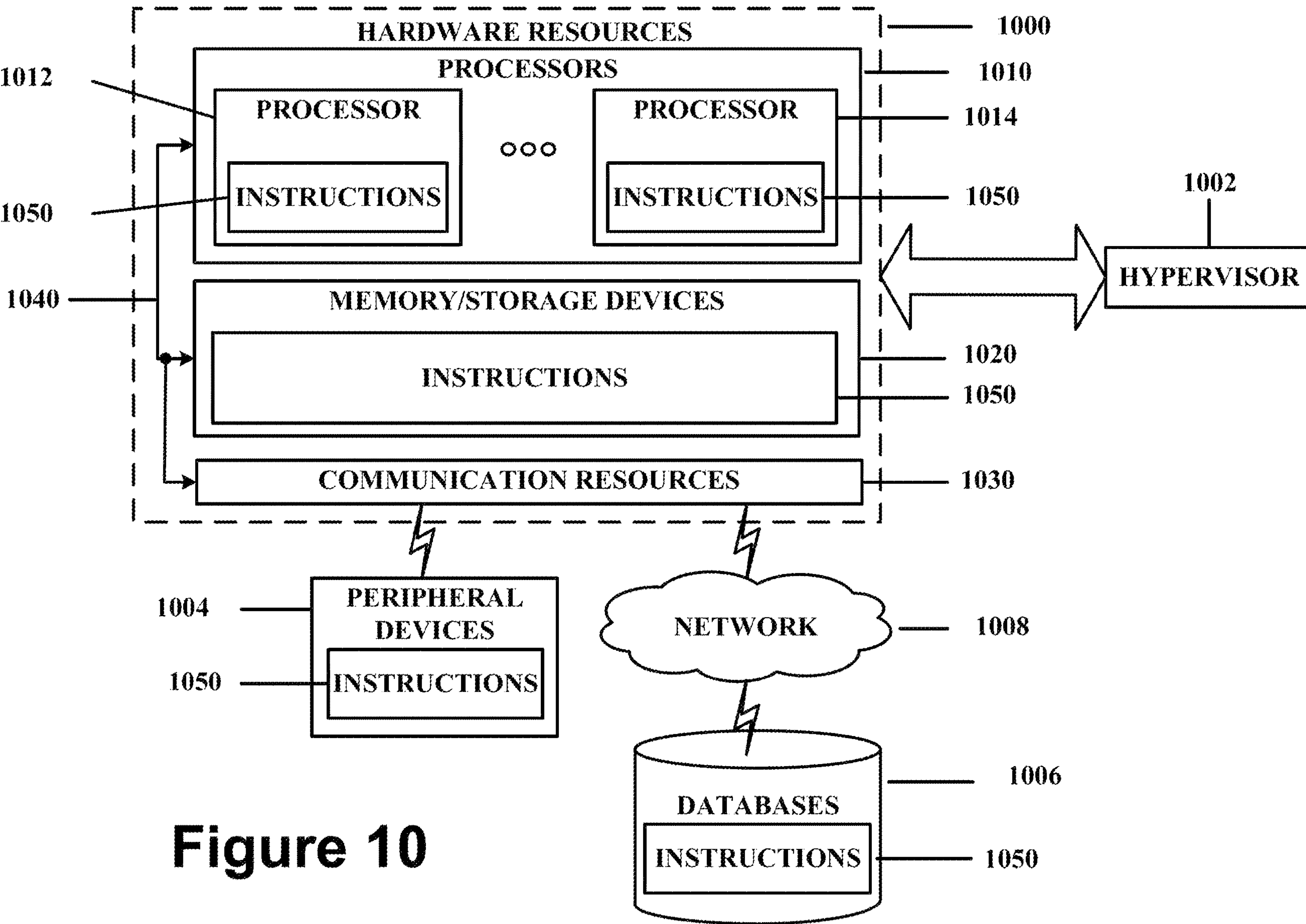
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 8-10 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1)

signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3rd party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

In some embodiments, the electronic device(s), network (s), system(s), chip(s) or component(s), or portions or implementations thereof, of FIGS. 8-10, or some other figure herein, may be configured to perform one or more processes, techniques, or methods as described herein, or portions thereof. One such process 1100 is depicted in FIG. 11. The process 1100 may be performed by a UE, a portion of a UE, and/or an electronic device that includes a UE. At 1102, the process 1100 may include receiving scheduling or configuration information for transmission of a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and transmission in an active uplink bandwidth part (BWP) in a non-NOSB-FD symbol. At 1104, the process 1100 may further include determining a starting physical resource block (PRB) for a frequency hop in the active uplink BWP or the uplink sub-band after the switch.

The scheduling or configuration information may be received, for example, in a DCI to dynamically schedule the PUSCH or PUCCH, and/or by higher layers (e.g., a RRC message and/or MAC CE to configure the PUSCH or PUCCH). The UE may transmit the PUSCH or PUCCH according to the determined starting PRB. In some embodiments, the starting PRB is determined in accordance with the active uplink BWP of the non-NOSB-FD symbol if the frequency hop is in the active uplink BWP and is determined in accordance with the uplink sub-band of the NOSB-FD symbol if the frequency hop is in the NOSB-FD symbol. In other embodiments, the starting PRB may be determined in accordance with the active uplink BWP both when the switch is from the non-NOSB-FD symbol to the NOSB-FD symbol and when the switch is from the NOSB-FD symbol to the non-NOSB-FD symbol. In yet other embodiments, the starting PRB may be determined in accordance with the uplink subband of the NOSB-FD symbol both when the switch is from the non-NOSB-FD symbol to the NOSB-FD symbol and when the switch is from the NOSB-FD symbol to the non-NOSB-FD symbol.

FIG. 12 illustrates another process 1200 in accordance with various embodiments. The process 1200 may be performed by a gNB, a portion of a gNB, and/or an electronic device that includes a gNB. At 1202, the process 1200 may include encoding, for transmission to a user equipment (UE), scheduling or configuration information for a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and transmission in an active uplink bandwidth part (BWP) in a non-NOSB-FD symbol. At 1204, the process 1200 may further include determining a starting physical resource block (PRB) for a frequency hop in the active uplink BWP or the uplink sub-band after the switch. At 1206, the process 1200 may further include receiving the PUSCH or PUCCH based on the determined starting PRB.

FIG. 13 illustrates another process 1300 in accordance with various embodiments. The process 1300 may be performed by a UE, a portion of a UE, and/or an electronic device that includes a UE. At 1302, the process 1300 may include receiving scheduling or configuration information for a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and an active uplink bandwidth part (BWP) in a non-NOSB-FD symbol. At 1304, the process 1300 may further include identifying that one or more physical resource blocks (PRBs) for a frequency hop of the PUSCH or PUCCH overlap with a downlink sub-band of the NOSB-FD symbol, or are not included in the uplink sub-band of the NOSB-FD symbol, or are not included in the uplink BWP. At 1306, the process 1300 may further include canceling the frequency hop of the PUSCH or the PUCCH based on the identification.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include one or more non-transitory computer-readable media (NTCRM) having instructions, stored thereon, that when executed by one or more processors configure a user equipment (UE) to: receive scheduling or configuration information for transmission of a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and transmission in an active uplink bandwidth part (BWP) in a non-NOSB-FD symbol; and determine a starting physical resource block (PRB) for a frequency hop in the active uplink BWP or the uplink sub-band after the switch.

Example A2 may include the one or more NTCRM of example A1, wherein the starting PRB is determined in accordance with the active uplink BWP if the frequency hop is in the non-NOSB-FD symbol and is determined in accordance with the uplink sub-band of the NOSB-FD symbol if the frequency hop is in the NOSB-FD symbol.

Example A3 may include the one or more NTCRM of example A1, wherein the starting PRB is determined in accordance with the active uplink BWP when the switch is from the non-NOSB-FD symbol to the NOSB-FD symbol and when the switch is from the NOSB-FD symbol to the non-NOSB-FD symbol.

Example A4 may include the one or more NTCRM of example A3, wherein, for the PUCCH, an index of starting PRB and an index of a first PRB prior to the frequency hop are determined in accordance with the active uplink BWP.

Example A5 may include the one or more NTCRM of example A3, wherein the instructions, when executed, further configure the UE to determine a frequency offset for transmission of the PUSCH based on the active uplink bandwidth part.

Example A6 may include the one or more NTCRM of example A1, wherein the starting PRB is determined in accordance with the uplink sub-band in the NOSB-FD symbol when the switch is from the non-NOSB-FD symbol to the NOSB-FD symbol and when the switch is from the NOSB-FD symbol to the non-NOSB-FD symbol.

Example A7 may include the one or more NTCRM of example A6, wherein, for the PUCCH, an index of starting PRB and an index of a first PRB prior to the frequency hop are determined in accordance with the uplink sub-band in the NOSB-FD.

Example A8 may include the one or more NTCRM of example A6, wherein the instructions, when executed, further configure the UE to determine a frequency offset for transmission of the PUSCH based on the uplink sub-band in the NOSB-FD.

Example A9 may include the one or more NTCRM of example A1, wherein the instructions, when executed, further configure the UE to encode the PUSCH or PUCCH for transmission based on the starting PRB.

Example A10 may include the one or more NTCRM of example A1, wherein the instructions, when executed, further configure the UE to: identify that the starting PRB or another PRB for the frequency hop overlaps with a downlink sub-band of the NOSB-FD symbol, or is not included in the uplink sub-band of the NOSB-FD symbol, or is not included in the uplink BWP; and cancel the frequency hop of the PUSCH or the PUCCH based on the identification.

Example A11 may include the one or more NTCRM of example A1, wherein the PUSCH is to be transmitted with a repetition type B, and wherein the instructions, when executed, further configure the UE to determine that a symbol is invalid for the repetition type B if one or more PRBs in the symbol that are allocated for the PUSCH overlap with a downlink sub-band of the NOSB-FD symbol, or are not included in the uplink sub-band of the NOSB-FD symbol, or are not included in the uplink BWP.

Example A12 may include the one or more NTCRM of example A1, wherein the PUSCH is to be transmitted with a repetition type A with counting, and wherein the instructions, when executed, further configure the UE to determine that a slot is not an available slot for the repetition type A with counting if one or more PRBs in the slot that are allocated for the PUSCH overlapping with a downlink subband of the NOSB-FD symbol, or are not included in an uplink subband of the NOSB-FD symbol, or are not included in the uplink BWP.

Example A13 may include one or more non-transitory computer-readable media (NTCRM) having instructions, stored thereon, that when executed by one or more processors configure a next generation Node B (gNB) to: encode, for transmission to a user equipment (UE), scheduling or configuration information for a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and transmission in an active uplink bandwidth part (BWP) in a non-NOSB-FD symbol; determine a starting physical resource block (PRB) for a frequency hop in the active uplink BWP or the uplink sub-band after the switch; and receive the PUSCH or PUCCH based on the determined starting PRB.

Example A14 may include the one or more NTCRM of example A13, wherein the starting PRB is determined based on the active uplink BWP if the frequency hop is in the non-NOSB-FD symbol and is determined based on the uplink sub-band of the NOSB-FD symbol if the frequency hop is in the NOSB-FD symbol.

Example A15 may include the one or more NTCRM of example A13: wherein the starting PRB is determined based on the active uplink BWP when the switch is from the non-NOSB-FD symbol to the NOSB-FD symbol and when the switch is from the NOSB-FD symbol to the non-NOSB-FD symbol; or wherein the starting PRB is determined in accordance with the uplink sub-band in the NOSB-FD symbol when the switch is from the non-NOSB-FD symbol to the NOSB-FD symbol and when the switch is from the NOSB-FD symbol to the non-NOSB-FD symbol.

Example A16 may include the one or more NTCRM of example A13, wherein the instructions, when executed, further configure the gNB to determine a frequency offset for the PUSCH based on the active uplink bandwidth part or the uplink sub-band in the NOSB-FD.

Example A17 may include the one or more NTCRM of example A13, wherein the instructions, when executed, further configure the UE to: identify that the starting PRB or another PRB for the frequency hop overlaps with a downlink subband of the NOSB-FD symbol, or is not included in an uplink subband of the NOSB-FD symbol, or is not included in the uplink BWP; and determine that the frequency hop of the PUSCH or the PUCCH is canceled based on the identification.

Example A18 may include one or more non-transitory computer-readable media (NTCRM) having instructions, stored thereon, that when executed by one or more processors configure a user equipment (UE) to: receive scheduling or configuration information for a physical uplink shared channel (PUSCH) or a physical uplink control channel (PUCCH) with frequency hopping that includes a switch between transmission in an uplink sub-band in a non-overlapping sub-band—full duplex (NOSB-FD) symbol and an active uplink bandwidth part (BWP) in a non-NOSB-FD symbol; identify that one or more physical resource blocks (PRBs) for a frequency hop of the PUSCH or PUCCH overlap with a downlink sub-band of the NOSB-FD symbol, or are not included in the uplink sub-band of the NOSB-FD symbol, or are not included in the uplink BWP; and cancel the frequency hop of the PUSCH or the PUCCH based on the identification.

Example A19 may include the one or more NTCRM of example A18, wherein the PUSCH is to be transmitted with a repetition type B, and wherein the instructions, when executed, further configure the UE to determine that a symbol is invalid for the repetition type B if one or more PRBs in the symbol that are allocated for the PUSCH overlap with the downlink sub-band of the NOSB-FD symbol, or are not included in the uplink sub-band of the NOSB-FD symbol, or are not included in the uplink BWP.

Example A20 may include the one or more NTCRM of example A18, wherein the PUSCH is to be transmitted with a repetition type A with counting, and wherein the instructions, when executed, further configure the UE to determine that a slot is not an available slot for the repetition type A with counting if one or more PRBs in the slot that are allocated for the PUSCH overlap with the downlink sub-band of the NOSB-FD symbol, or are not included in the uplink sub-band of the NOSB-FD symbol, or are not included in the uplink BWP.

Example B1 may include a method of wireless communication (e.g., for a fifth generation (5G) or new radio (NR) system), the method comprising: determining, by a UE, an uplink subband in Non-Overlapping Sub-Band Full Duplex (NOSB-FD); switching, by the UE, from the determined uplink subband in NOSB-FD symbols to active uplink bandwidth part (BWP); and determining, by the UE, a frequency resource for a physical uplink shared channel (PUSCH) or a physical uplink control channel (PUCCH) transmission when frequency hopping is enabled.

Example B2 may include the method of example B1 or some other example herein, wherein in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the active UL BWP.

Example B3 may include the method of example B1 or some other example herein, wherein in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the active UL BWP if the PUSCH or PUCCH, including any repetitions, does not overlap with a NOSB-FD symbol.

Example B4 may include the method of example B1 or some other example herein, wherein in case of frequency hopping, when UE may switch from UL subband in NOSB-FD symbol to active UL BWP, or vice versa, for the PUSCH or PUCCH transmission, the starting PRB for a frequency hop is determined in accordance with the UL SB in NOSB-FD symbols, regardless of whether UE may switch from UL subband in NOSB-FD symbol to active UL BWP, or vice versa.

Example B5 may include the method of example B1 or some other example herein, wherein in case of frequency hopping, when UE may switch from UL subband in NOSB-FD symbol to active UL BWP, or vice versa, for the PUSCH or PUCCH transmission, the starting physical resource block (PRB) for a frequency hop is determined in accordance with the UL subband in NOSB-FD symbols if the PUSCH or PUCCH, including any repetitions, does not overlap with a regular (UL or Flexible) symbol.

Example B6 may include the method of example B1 or some other example herein, wherein in case when an UL BWP is configured within NOSB-FD symbols, in case of frequency hopping, when UE may switch from UL subband in NOSB-FD symbol to active UL BWP, or vice versa, for the PUSCH or PUCCH transmission, the starting PRB for a frequency hop is determined in accordance with an UL BWP, which is configured in a NOSB-FD symbol.

Example B7 may include the method of example B1 or some other example herein, wherein in case of frequency hopping, when UE may switch from UL subband in NOSB-FD symbol to active UL BWP, or vice versa, for the PUSCH and/or PUCCH transmission, the starting PRB for a frequency hop is determined in accordance with one of: (i) UL SB in NOSB-FD symbols or UL BWP configured in NOSB-FD symbols and (ii) active UL BWP, whichever is associated with the smaller BW.

Example B8 may include the method of example B1 or some other example herein, wherein in case of frequency hopping, when UE may switch from UL subband in NOSB-FD symbol to active UL BWP, or vice versa, for the PUSCH and/or PUCCH transmission, the starting PRB for a frequency hop is determined in accordance with a frequency region where the first configured, scheduled, or valid PUSCH or PUCCH transmission or the first hop of the PUSCH/PUCCH transmission is located.

Example B9 may include the method of example B1 or some other example herein, wherein in case of frequency hopping, when UE may switch from UL subband in NOSB-FD symbol to active UL BWP, or vice versa, for the PUSCH and/or PUCCH transmission, the starting PRB for a frequency hop is determined in accordance with a frequency region where the first symbol of the PUSCH and/or PUCCH transmission in each hop is located.

Example B10 may include the method of example B1 or some other example herein, wherein in case of frequency hopping, when UE may switch from UL subband in NOSB-FD symbol to active UL BWP, or vice versa, for the PUSCH and/or PUCCH transmission, if the determined PRBs for a hop overlap with a DL subband or are not included in the UL BWP or UL subband in NOSB-FD symbols, the PUSCH or PUCCH transmission in the hop may be cancelled.

Example B11 may include the method of example B1 or some other example herein, wherein if the determined PRBs for a hop overlap with a DL subband or are not included in the UL BWP or UL subband in NOSB-FD symbols, the PUSCH or PUCCH repetition or slot or transmission occasion associated with the corresponding hop may be cancelled.

Example B12 may include the method of example B1 or some other example herein, wherein if the determined PRBs for a hop overlap with a DL subband or are not included in the UL BWP or UL subband in NOSB-FD symbols, the whole PUSCH or PUCCH transmission may be cancelled.

Example B13 may include the method of example B1 or some other example herein, wherein a UE does not expect that a determined PRBs for a hop of an UL transmission overlap with a DL sub-band.

Example B14 may include the method of example B1 or some other example herein, wherein for PUSCH repetition type B, in case of frequency hopping, when UE may switch from UL subband in NOSB-FD symbol to active UL BWP, or vice versa, if the determined PRBs for a hop overlap with a DL subband or are not included in the UL BWP or UL subband in NOSB-FD symbols, the symbols that include the overlapped PRBs are considered as invalid symbols.

Example B15 may include the method of example B1 or some other example herein, wherein for PUSCH repetition type A with counting based on available slot, TBoMS and PUCCH repetitions, when UE may switch from UL subband in NOSB-FD symbol to active UL BWP, or vice versa, for the PUSCH and/or PUCCH transmission, a slot is not counted as available slot if the determined PRBs for a hop in the slot overlap with a DL subband or are not included in the UL BWP or UL subband in NOSB-FD symbols.

Example B16 includes a method to be performed by a user equipment (UE), an electronic device that includes a UE, or a portion of a UE, wherein the method comprises: identifying that a physical uplink shared channel (PUSCH) or a physical uplink control channel (PUCCH) transmission is to occur on one of an active uplink bandwidth part (BWP) or a full duplex symbol; identifying that frequency hopping is active; identifying, based on the identification that frequency hopping is active, a starting PRB on the other of the active uplink BWP or the full duplex symbol; and transmitting the PUSCH or PUCCH transmission based on the starting PRB.

Example B17 includes the method of example B16, and/or some other example herein, wherein the full duplex symbol is a non-overlapping sub-band full duplex (NOSB-FD) symbol.

Example B18 includes the method of example B17, and/or some other example herein, wherein the NOSB-FD symbols allows uplink transmission at a first frequency of the symbol concurrently with downlink transmission at a second frequency of the symbol.

Example B19 includes the method of any of examples B16-B18, and/or some other example herein, wherein the determination of the starting PRB is based on an indication from a fifth generation (5G) base station (gNB) of a 5G network of which the UE is a part.

Example B20 includes the method of any of examples B16-B19, and/or some other example herein, wherein the determination of the starting PRB is based on the active uplink BWP.

Example B21 includes the method of any of examples B16-B20, and/or some other example herein, wherein the determination of the starting PRB is preconfigured.

Example Z01 may include an apparatus comprising means to perform one or more elements of a method described in or related to any of examples A1-A25, B1-B21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A25, B1-B21, or any other method or process described herein.

Example Z03 may include an apparatus comprising logic, modules, or circuitry to perform one or more elements of a method described in or related to any of examples A1-A25, B1-B21, or any other method or process described herein.

Example Z04 may include a method, technique, or process as described in or related to any of examples A1-A25, B1-B21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A25, B1-B21, or portions thereof.

Example Z06 may include a signal as described in or related to any of examples A1-A25, B1-B21, or portions or parts thereof.

Example Z07 may include a datagram, packet, frame, segment, protocol data unit (PDU), or message as described in or related to any of examples A1-A25, B1-B21, or portions or parts thereof, or otherwise described in the present disclosure.

Example Z08 may include a signal encoded with data as described in or related to any of examples A1-A25, B1-B21, or portions or parts thereof, or otherwise described in the present disclosure.

Example Z09 may include a signal encoded with a datagram, packet, frame, segment, protocol data unit (PDU), or message as described in or related to any of examples A1-A25, B1-B21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A25, B1-B21, or portions thereof.

Example Z11 may include a computer program comprising instructions, wherein execution of the program by a processing element is to cause the processing element to carry out the method, techniques, or process as described in or related to any of examples A1-A25, B1-B21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |

-continued

| | |
|---|---|
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |

-continued

| | |
|---|---|
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |

-continued

| | |
|---|---|
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced |
| PDCCH, | enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |

| | |
|---|---|
| E-UTRA | Evolved UTRA |
| E-UTRAN | Evolved UTRAN |
| EV2X | Enhanced V2X |
| F1AP F1 | Application Protocol |
| F1-C | F1 Control plane interface |
| F1-U F1 | User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN GSM EDGE RAN, | GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |

| | |
|---|---|
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |

-continued

| | |
|---|---|
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia Public identity |
| IMS | IP Multimedia Subsystem |
| IMSI | International Mobile Subscriber Identity |
| IoT | Internet of Things |
| IP | Internet Protocol Ipsec IP Security, Internet Protocol Security |
| IP-CAN | IP-Connectivity Access Network |
| IP-M | IP Multicast |
| IPv4 | Internet Protocol Version 4 |
| IPV6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, |
| USIM | Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier ksps kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |

-continued

| | |
|---|---|
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LCC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |

-continued

| | |
|---|---|
| MGRP | Measurement Gap Repetition Period |
| MIB | Master Information Block Management |
| MIMO | Multiple Input Multiple Output |
| MLC | Mobile Location Centre |
| MM | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated. Mobile Termination |
| MTC | Machine-Type Communications |
| MMTCmassive | MTC, Massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |

-continued

| | |
|---|---|
| NF | Nework Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System N-PoP Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |

-continued

| | |
|---|---|
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |

-continued

| | |
|---|---|
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-Tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS FLow ID, Qos Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |

-continued

| | |
|---|---|
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |

-continued

| | |
|---|---|
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlik |
| SDNF | Structured Data Storage Network Function |
| SDP | Session Description Protocol |
| SDSF | Structured Data Storage Function |
| SDT | Small Data Transmisssion |
| SDU | Service Data Unit |
| SEAF | Security Anchor Function |
| SeNB | secondary eNB |
| SEPP | Security Edge Protecion Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI_RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |

-continued

| | |
|---|---|
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB Signal | Synchronization Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |

-continued

| | |
|---|---|
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval Tx Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |

-continued

| | |
|---|---|
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors configure a user equipment (UE) to:

receive scheduling or configuration information for transmission of a physical uplink shared channel (PUSCH) or a physical uplink control channel (PUCCH) with frequency hopping that includes a switch between transmission in an uplink sub-band in a non-overlapping sub-band-full duplex (NOSB-FD) symbol and transmission in an active uplink bandwidth part (BWP) in a non-NOSB-FD symbol; and determine a starting physical resource block (PRB) for a frequency hop in the active uplink BWP or the uplink sub-band after the switch, wherein the determination of the starting PRB for the frequency hop is performed based on a frequency region corresponding to where a first symbol of the PUSCH or PUCCH is located in each hop.

2. The one or more NTCRM of claim 1, wherein the starting PRB is determined in accordance with the active uplink BWP if the frequency hop is in the non-NOSB-FD symbol and is determined in accordance with the uplink sub-band of the NOSB-FD symbol if the frequency hop is in the NOSB-FD symbol.

3. The one or more NTCRM of claim 1, wherein the starting PRB is determined in accordance with the active uplink BWP when the switch is from the non-NOSB-FD symbol to the NOSB-FD symbol and when the switch is from the NOSB-FD symbol to the non-NOSB-FD symbol.

4. The one or more NTCRM of claim 3, wherein, for the PUCCH, an index of starting PRB and an index of a first PRB prior to the frequency hop are determined in accordance with the active uplink BWP.

5. The one or more NTCRM of claim 3, wherein the instructions, when executed, further configure the UE to determine a frequency offset for transmission of the PUSCH based on the active uplink bandwidth part.

6. The one or more NTCRM of claim 1, wherein the starting PRB is determined in accordance with the uplink sub-band in the NOSB-FD symbol when the switch is from the non-NOSB-FD symbol to the NOSB-FD symbol and when the switch is from the NOSB-FD symbol to the non-NOSB-FD symbol.

7. The one or more NTCRM of claim 6, wherein, for the PUCCH, an index of starting PRB and an index of a first PRB prior to the frequency hop are determined in accordance with the uplink sub-band in the NOSB-FD.

8. The one or more NTCRM of claim 6, wherein the instructions, when executed, further configure the UE to determine a frequency offset for transmission of the PUSCH based on the uplink sub-band in the NOSB-FD.

9. The one or more NTCRM of claim 1, wherein the instructions, when executed, further configure the UE to encode the PUSCH or PUCCH for transmission based on the starting PRB.

10. The one or more NTCRM of claim 1, wherein the instructions, when executed, further configure the UE to:

identify that the starting PRB or another PRB for the frequency hop overlaps with a downlink sub-band of the NOSB-FD symbol, or is not included in the uplink sub-band of the NOSB-FD symbol, or is not included in the uplink BWP; and cancel the frequency hop of the PUSCH or the PUCCH based on the identification.

11. The one or more NTCRM of claim 1, wherein the PUSCH is to be transmitted with a repetition type B, and wherein the instructions, when executed, further configure the UE to determine that a symbol is invalid for the repetition type B if one or more PRBs in the symbol that are allocated for the PUSCH overlap with a downlink sub-band of the NOSB-FD symbol, or are not included in the uplink sub-band of the NOSB-FD symbol, or are not included in the uplink BWP.

12. The one or more NTCRM of claim 1, wherein the PUSCH is to be transmitted with a repetition type A with counting, and wherein the instructions, when executed, further configure the UE to determine that a slot is not an available slot for the repetition type A with counting if one or more PRBs in the slot that are allocated for the PUSCH overlapping with a downlink subband of the NOSB-FD symbol, or are not included in an uplink subband of the NOSB-FD symbol, or are not included in the uplink BWP.

13. One or more non-transitory computer-readable media (NTCRM) having instructions, stored thereon, that when executed by one or more processors configure a next generation Node B (gNB) to:

encode, for transmission to a user equipment (UE), scheduling or configuration information for a physical uplink shared channel (PUSCH) or a physical uplink control channel (PUCCH) with frequency hopping that includes a switch between transmission in an uplink sub-band in a non-overlapping sub-band-full duplex (NOSB-FD) symbol and transmission in an active uplink bandwidth part (BWP) in a non-NOSB-FD symbol;

determine a starting physical resource block (PRB) for a frequency hop in the active uplink BWP or the uplink sub-band after the switch, wherein the determination of the starting PRB for the frequency hop is performed based on a frequency region corresponding to where a first symbol of the PUSCH or PUCCH is located in each hop; and receive the PUSCH or PUCCH based on the determined starting PRB.

14. The one or more NTCRM of claim 13, wherein the starting PRB is determined based on the active uplink BWP if the frequency hop is in the non-NOSB-FD symbol and is determined based on the uplink sub-band of the NOSB-FD symbol if the frequency hop is in the NOSB-FD symbol.

15. The one or more NTCRM of claim 13:

wherein the starting PRB is determined based on the active uplink BWP when the switch is from the non-NOSB-FD symbol to the NOSB-FD symbol and when the switch is from the NOSB-FD symbol to the non-NOSB-FD symbol; or wherein the starting PRB is determined in accordance with the uplink sub-band in the NOSB-FD symbol when the switch is from the non-NOSB-FD symbol to the NOSB-FD symbol and when the switch is from the NOSB-FD symbol to the non-NOSB-FD symbol.

16. The one or more NTCRM of claim 13, wherein the instructions, when executed, further configure the gNB to determine a frequency offset for the PUSCH based on the active uplink bandwidth part or the uplink sub-band in the NOSB-FD.

17. The one or more NTCRM of claim 13, wherein the instructions, when executed, further configure the UE to:

identify that the starting PRB or another PRB for the frequency hop overlaps with a downlink subband of the NOSB-FD symbol, or is not included in an uplink subband of the NOSB-FD symbol, or is not included in the uplink BWP; and determine that the frequency hop of the PUSCH or the PUCCH is canceled based on the identification.

18. One or more non-transitory computer-readable media (NTCRM) having instructions, stored thereon, that when executed by one or more processors configure a user equipment (UE) to:

receive scheduling or configuration information for a physical uplink shared channel (PUSCH) or a physical uplink control channel (PUCCH) with frequency hopping that includes a switch between transmission in an uplink sub-band in a non-overlapping sub-band-full duplex (NOSB-FD) symbol and an active uplink bandwidth part (BWP) in a non-NOSB-FD symbol;

identify that one or more physical resource blocks (PRBs) for a frequency hop of the PUSCH or PUCCH overlap with a downlink sub-band of the NOSB-FD symbol, or are not included in the uplink sub-band of the NOSB-FD symbol, or are not included in the uplink BWP; and cancel the frequency hop of the PUSCH or the PUCCH based on the identification, wherein a determination of a starting PRB for the frequency hop is performed based on a frequency region corresponding to where a first symbol of the PUSCH or PUCCH is located in each hop.

19. The one or more NTCRM of claim 18, wherein the PUSCH is to be transmitted with a repetition type B, and wherein the instructions, when executed, further configure the UE to determine that a symbol is invalid for the repetition type B if one or more PRBs in the symbol that are allocated for the PUSCH overlap with the downlink sub-band of the NOSB-FD symbol, or are not included in the uplink sub-band of the NOSB-FD symbol, or are not included in the uplink BWP.

20. The one or more NTCRM of claim 18, wherein the PUSCH is to be transmitted with a repetition type A with counting, and wherein the instructions, when executed, further configure the UE to determine that a slot is not an available slot for the repetition type A with counting if one or more PRBs in the slot that are allocated for the PUSCH overlap with the downlink sub-band of the NOSB-FD symbol, or are not included in the uplink sub-band of the NOSB-FD symbol, or are not included in the uplink BWP.

* * * * *